(12) United States Patent
Musick et al.

(10) Patent No.: US 9,102,476 B2
(45) Date of Patent: Aug. 11, 2015

(54) CONVEYOR SYSTEM WEAR INDICATION DEVICES AND METHODS

(71) Applicant: Solus Industrial Innovations, LLC, Florence, KY (US)

(72) Inventors: Scott Musick, Alexandria, KY (US); Brian Lawrenz, Birmingham, AL (US); Bruce Wagner, Arnold, MD (US)

(73) Assignee: Solus Industrial Innovations, LLC, Florence, KY (US)

( * ) Notice: Subject to any disclaimer, the term of this patent is extended or adjusted under 35 U.S.C. 154(b) by 0 days.

(21) Appl. No.: 14/061,630

(22) Filed: Oct. 23, 2013

(65) Prior Publication Data

US 2014/0116850 A1    May 1, 2014

Related U.S. Application Data

(60) Provisional application No. 61/718,669, filed on Oct. 25, 2012.

(51) Int. Cl.
| | | |
|---|---|---|
| *B65G 17/00* | (2006.01) | |
| *B65G 21/22* | (2006.01) | |
| *B65G 17/08* | (2006.01) | |

(52) U.S. Cl.
CPC .............. *B65G 21/22* (2013.01); *B65G 17/086* (2013.01); *B65G 2207/48* (2013.01)

(58) Field of Classification Search
CPC ...................................................... B65G 15/62
USPC ......................................... 198/831, 841, 837
See application file for complete search history.

(56) References Cited

U.S. PATENT DOCUMENTS

| | | |
|---|---|---|
| 1,996,586 A | 4/1935 | Meyer |
| 2,234,537 A | 3/1941 | Blackburn |
| 2,906,395 A | 9/1959 | Greer |
| 3,467,239 A | 9/1969 | Roinestad |
| 3,584,731 A | 6/1971 | Dahlem |
| 3,651,924 A | 3/1972 | Homeier et al. |
| 3,685,367 A | 8/1972 | Dawson |
| 3,693,780 A | 9/1972 | Fraioli, Sr. |

(Continued)

FOREIGN PATENT DOCUMENTS

| | | |
|---|---|---|
| CA | 2327646 | 6/2002 |
| CA | 2411869 | 5/2004 |

(Continued)

OTHER PUBLICATIONS

International Search Report and Written Opinion in corresponding PCT Application No. PCT/US2013/066463, mailed Jan. 17, 2014, in 13 pages.

(Continued)

*Primary Examiner* — James R Bidwell
(74) *Attorney, Agent, or Firm* — Knobbe, Martens, Olson & Bear, LLP

(57) ABSTRACT

A wear-indicating conveyor track including an upper surface configured to interface with a moveable conveyor and one or more indicators disposed on or in at least the upper surface of the track. The one or more indicators can be configured to be substantially obscured by a conveyor placed on the track upon initial use, and the one or more indicators can be configured to be substantially unobscured by the conveyor when the conveyor is moving relative to the track and the track is in need of repair or replacement.

22 Claims, 8 Drawing Sheets

(56) References Cited

U.S. PATENT DOCUMENTS

| | | |
|---|---|---|
| 3,854,575 A | 12/1974 | Fraioli, Sr. |
| 3,929,179 A | 12/1975 | Hines |
| 3,946,857 A | 3/1976 | Fraioli, Sr. |
| 4,037,713 A | 7/1977 | Soliman et al. |
| 4,089,406 A | 5/1978 | Teske et al. |
| 4,153,152 A | 5/1979 | Lapeyre |
| 4,222,483 A | 9/1980 | Wootton et al. |
| 4,280,620 A | 7/1981 | Baker, Jr. |
| 4,645,070 A | 2/1987 | Homeier |
| 4,645,476 A | 2/1987 | King et al. |
| 4,742,907 A | 5/1988 | Palmaer |
| 4,865,184 A | 9/1989 | Wechner |
| 4,867,301 A | 9/1989 | Roinestad et al. |
| 4,893,710 A | 1/1990 | Bailey et al. |
| 4,901,844 A | 2/1990 | Palmaer et al. |
| 4,919,252 A | 4/1990 | Wechner |
| 4,934,517 A | 6/1990 | Lapeyre |
| 4,940,133 A | 7/1990 | Roinestad et al. |
| 4,951,807 A | 8/1990 | Roinestad et al. |
| 4,953,693 A | 9/1990 | Draebel |
| 4,957,597 A | 9/1990 | Irwin |
| 4,972,942 A | 11/1990 | Faulkner |
| 5,004,097 A | 4/1991 | Roinestad et al. |
| 5,031,757 A | 7/1991 | Draebel et al. |
| 5,070,999 A | 12/1991 | Layne et al. |
| 5,072,826 A | 12/1991 | Wechner |
| 5,125,504 A | 6/1992 | Corlett et al. |
| 5,127,515 A | 7/1992 | Damkjaer |
| 5,131,526 A | 7/1992 | Kaak |
| 5,139,135 A | 8/1992 | Irwin et al. |
| 5,141,099 A | 8/1992 | Baumgartner |
| 5,141,102 A | 8/1992 | Roinestad et al. |
| 5,174,439 A | 12/1992 | Spangler et al. |
| 5,176,247 A | 1/1993 | Counter et al. |
| 5,181,601 A | 1/1993 | Palmaer et al. |
| 5,197,591 A | 3/1993 | Roinestad et al. |
| 5,217,110 A | 6/1993 | Spangler |
| 5,224,583 A | 7/1993 | Palmaer et al. |
| 5,253,749 A | 10/1993 | Ensch |
| 5,271,491 A | 12/1993 | Irwin |
| 5,303,817 A | 4/1994 | Kissee |
| 5,303,818 A | 4/1994 | Gruettner et al. |
| 5,307,923 A | 5/1994 | Damkjaer |
| 5,310,046 A | 5/1994 | Palmaer et al. |
| 5,318,169 A | 6/1994 | Faulkner et al. |
| 5,330,046 A | 7/1994 | Yuzawa et al. |
| 5,335,768 A | 8/1994 | Schladweiler |
| 5,346,059 A | 9/1994 | Irwin |
| 5,358,096 A | 10/1994 | Faulkner et al. |
| 5,361,892 A * | 11/1994 | Hamaker et al. ............... 198/841 |
| 5,372,248 A | 12/1994 | Horton |
| 5,375,697 A | 12/1994 | Battati et al. |
| 5,402,877 A | 4/1995 | Thiele et al. |
| 5,419,428 A | 5/1995 | Palmaer et al. |
| 5,428,437 A | 6/1995 | Carter et al. |
| 5,429,227 A | 7/1995 | Krossmann et al. |
| 5,431,275 A | 7/1995 | Faulkner |
| 5,469,958 A | 11/1995 | Gruettner et al. |
| 5,489,020 A | 2/1996 | Clopton |
| 5,501,319 A | 3/1996 | Larson et al. |
| 5,547,071 A | 8/1996 | Palmaer et al. |
| 5,558,204 A | 9/1996 | Daringer |
| 5,562,200 A | 10/1996 | Daringer |
| 5,566,817 A | 10/1996 | Meeker |
| 5,573,105 A | 11/1996 | Palmaer |
| 5,573,106 A | 11/1996 | Palmaer |
| 5,598,916 A | 2/1997 | Horton et al. |
| 5,601,180 A * | 2/1997 | Steeber et al. ............... 198/841 |
| 5,613,597 A | 3/1997 | Palmaer et al. |
| 5,622,252 A | 4/1997 | Raum |
| 5,645,160 A | 7/1997 | Palmaer |
| 5,662,211 A | 9/1997 | Quentin |
| 5,690,210 A | 11/1997 | Layne |
| 5,697,492 A | 12/1997 | Damkjaer |
| 5,738,205 A | 4/1998 | Draebel |
| 5,775,480 A | 7/1998 | Lapeyre et al. |
| 5,779,027 A * | 7/1998 | Ensch et al. ............... 198/841 |
| 5,791,455 A | 8/1998 | Clopton |
| 5,797,820 A | 8/1998 | Endo |
| 5,816,390 A | 10/1998 | Stebnicki |
| 5,826,705 A | 10/1998 | Ramsey et al. |
| 5,860,512 A * | 1/1999 | Gianvito et al. ............... 198/841 |
| 5,881,863 A | 3/1999 | Borner |
| 5,904,241 A | 5/1999 | Verdigets et al. |
| 5,906,270 A | 5/1999 | Faulkner |
| 5,921,379 A | 7/1999 | Horton |
| 5,927,479 A | 7/1999 | Merten et al. |
| 5,947,265 A | 9/1999 | Merten et al. |
| 5,954,187 A | 9/1999 | Hager |
| 5,960,937 A | 10/1999 | Stebnicki et al. |
| 5,966,923 A | 10/1999 | Nakamura |
| 6,006,898 A | 12/1999 | Odink |
| 6,036,001 A | 3/2000 | Stebnicki et al. |
| 6,036,002 A | 3/2000 | Kobayashi et al. |
| 6,041,917 A | 3/2000 | Layne |
| 6,050,397 A | 4/2000 | Kato et al. |
| 6,073,756 A | 6/2000 | Damkjaer et al. |
| 6,079,543 A | 6/2000 | Palmaer |
| 6,079,552 A | 6/2000 | Reichert et al. |
| 6,125,995 A | 10/2000 | Layne et al. |
| 6,129,202 A | 10/2000 | Layne et al. |
| 6,142,294 A | 11/2000 | Kobayashi et al. |
| 6,142,295 A | 11/2000 | Greve |
| 6,196,379 B1 | 3/2001 | Van Esch et al. |
| 6,196,381 B1 | 3/2001 | Kato et al. |
| 6,202,834 B1 | 3/2001 | Layne et al. |
| 6,209,716 B1 | 4/2001 | Bogle et al. |
| 6,213,292 B1 | 4/2001 | Takahashi et al. |
| 6,216,854 B1 | 4/2001 | Damkjaer et al. |
| 6,223,889 B1 | 5/2001 | Layne et al. |
| 6,253,911 B1 | 7/2001 | Layne et al. |
| 6,298,982 B1 | 10/2001 | Layne et al. |
| 6,305,530 B1 | 10/2001 | Guldenfels |
| 6,330,941 B1 | 12/2001 | Guldenfels |
| 6,345,715 B2 | 2/2002 | Palmaer |
| 6,357,581 B1 | 3/2002 | Guldenfels |
| 6,360,882 B1 | 3/2002 | Maine, Jr. et al. |
| 6,364,094 B1 | 4/2002 | Alstmar |
| 6,364,095 B1 | 4/2002 | Layne et al. |
| 6,371,284 B1 | 4/2002 | Pasch |
| 6,382,404 B1 | 5/2002 | Guldenfels |
| 6,382,405 B1 | 5/2002 | Palmaer |
| 6,386,355 B1 | 5/2002 | Willems |
| 6,390,285 B2 | 5/2002 | De Geus et al. |
| 6,401,914 B1 | 6/2002 | Greve |
| 6,425,479 B1 | 7/2002 | Guldenfels et al. |
| 6,439,378 B1 | 8/2002 | MacLachlan |
| 6,471,046 B2 | 10/2002 | Layne et al. |
| 6,471,048 B1 | 10/2002 | Thompson, Jr. et al. |
| 6,474,464 B1 | 11/2002 | Horton et al. |
| 6,484,379 B2 | 11/2002 | Palmaer |
| 6,491,152 B1 | 12/2002 | Evers, Jr. et al. |
| 6,516,944 B2 | 2/2003 | Guldenfels |
| 6,523,680 B2 | 2/2003 | Guldenfels |
| 6,578,704 B1 | 6/2003 | MacLachlan |
| 6,581,758 B1 | 6/2003 | van-Zijderveld et al. |
| 6,585,110 B2 | 7/2003 | Layne et al. |
| 6,591,967 B1 | 7/2003 | Doudement et al. |
| 6,615,979 B2 | 9/2003 | Etherington et al. |
| 6,644,466 B2 | 11/2003 | Knott et al. |
| 6,662,938 B2 | 12/2003 | Damkjaer |
| 6,672,451 B1 | 1/2004 | Thompson, Jr. et al. |
| 6,705,460 B2 | 3/2004 | Weiser et al. |
| 6,705,461 B2 | 3/2004 | Kuharevicz et al. |
| 6,758,776 B2 | 7/2004 | Fye et al. |
| 6,766,899 B1 | 7/2004 | Guldenfels |
| 6,779,652 B2 | 8/2004 | Baier et al. |
| 6,793,069 B2 | 9/2004 | Guldenfels |
| RE38,607 E | 10/2004 | Guldenfels et al. |
| 6,827,204 B2 | 12/2004 | Cribiu' |
| 6,837,367 B1 | 1/2005 | Klein et al. |
| 6,854,593 B2 | 2/2005 | Boudreau |
| 6,874,617 B1 | 4/2005 | Layne |
| 6,880,696 B2 | 4/2005 | Cediel et al. |

(56) References Cited

U.S. PATENT DOCUMENTS

| | | |
|---|---|---|
| 6,896,126 B2 | 5/2005 | Guldenfels |
| 6,910,572 B2 | 6/2005 | Shibayama et al. |
| 6,918,486 B2 | 7/2005 | Shibayama et al. |
| 6,948,613 B2 | 9/2005 | Guldenfels et al. |
| 7,051,870 B2 | 5/2006 | Schoendienst et al. |
| 7,070,043 B1 | 7/2006 | MacLachlan et al. |
| 7,073,662 B2 | 7/2006 | Neely et al. |
| 7,080,729 B2 | 7/2006 | Guldenfels et al. |
| 7,108,126 B2 | 9/2006 | Layne et al. |
| 7,108,127 B2 | 9/2006 | Krisl |
| 7,147,099 B2 | 12/2006 | Guernsey et al. |
| 7,159,709 B2 | 1/2007 | Petrovic |
| 7,168,557 B2 | 1/2007 | Mitchell et al. |
| 7,178,664 B2 * | 2/2007 | Okabe ........................ 198/841 |
| 7,228,959 B1 | 6/2007 | Harrison |
| 7,234,589 B2 | 6/2007 | Sedlacek |
| 7,244,205 B2 | 7/2007 | Kanaris |
| 7,252,192 B2 | 8/2007 | Stebnicki et al. |
| 7,267,222 B2 | 9/2007 | Montemartini et al. |
| 7,281,626 B2 | 10/2007 | Guldenfels |
| 7,284,657 B2 | 10/2007 | Ulsh et al. |
| 7,293,644 B2 | 11/2007 | Stebnicki et al. |
| 7,314,132 B2 | 1/2008 | Layne et al. |
| 7,331,447 B2 | 2/2008 | Krisl et al. |
| 7,364,036 B2 | 4/2008 | Schoepf |
| 7,367,448 B2 | 5/2008 | Fandella |
| 7,410,047 B2 | 8/2008 | van Faassen |
| 7,419,051 B2 | 9/2008 | Damkjaer |
| 7,438,179 B2 | 10/2008 | Gundlach |
| 7,441,649 B2 | 10/2008 | Layne et al. |
| 7,494,005 B2 | 2/2009 | Messick, Jr. et al. |
| 7,494,006 B2 | 2/2009 | Knott et al. |
| 7,530,454 B2 | 5/2009 | Neely et al. |
| 7,556,143 B2 | 7/2009 | Crooks |
| 7,556,145 B2 | 7/2009 | Elsner |
| 7,559,421 B1 | 7/2009 | McDaniel et al. |
| 7,559,422 B2 | 7/2009 | Layne et al. |
| 7,600,632 B2 | 10/2009 | Hall |
| 7,600,633 B2 | 10/2009 | Rathbun et al. |
| 7,604,111 B2 | 10/2009 | Zmaj |
| 7,624,858 B2 | 12/2009 | Delair et al. |
| 7,635,060 B2 | 12/2009 | Lagneaux |
| 7,661,524 B2 | 2/2010 | Damkjaer |
| 7,690,501 B2 | 4/2010 | Menke et al. |
| 7,699,160 B2 | 4/2010 | Marsetti |
| 7,753,193 B2 | 7/2010 | Kanaris |
| 7,757,839 B2 | 7/2010 | Boudreau |
| 7,766,159 B2 | 8/2010 | Krisl |
| 7,802,675 B2 | 9/2010 | Hall |
| 7,828,136 B2 | 11/2010 | Damkjaer |
| 7,837,028 B2 | 11/2010 | Elsner |
| 7,837,029 B2 | 11/2010 | Russell |
| 7,841,462 B2 | 11/2010 | Layne et al. |
| 7,850,001 B2 | 12/2010 | Krisl |
| 7,854,315 B2 | 12/2010 | Stebnicki et al. |
| 7,967,132 B2 | 6/2011 | Menke et al. |
| 7,975,840 B2 | 7/2011 | Messick, Jr. et al. |
| 7,987,974 B2 | 8/2011 | Montgomery et al. |
| 8,002,109 B2 | 8/2011 | Rogers et al. |
| 8,047,356 B2 | 11/2011 | Elsner |
| 8,083,053 B2 | 12/2011 | Paardekooper et al. |
| 8,113,340 B1 | 2/2012 | Smith et al. |
| 6,523,680 C1 | 4/2013 | Guldenfels |
| 8,453,830 B2 | 6/2013 | Boudreau |
| 2001/0050214 A1 | 12/2001 | Guldenfels |
| 2002/0175056 A1 | 11/2002 | Damkjar |
| 2002/0179417 A1 | 12/2002 | Cediel et al. |
| 2002/0195321 A1 | 12/2002 | Guldenfels |
| 2003/0057061 A1 | 3/2003 | Guldenfels |
| 2003/0192777 A1 | 10/2003 | Guldenfels |
| 2004/0045795 A1 | 3/2004 | Guldenfels |
| 2004/0140182 A1 | 7/2004 | Morris |
| 2005/0109589 A1 | 5/2005 | Guldenfels |
| 2005/0241922 A1 | 11/2005 | Petrovic |
| 2006/0237290 A1 | 10/2006 | Guldenfels et al. |
| 2006/0249359 A1 | 11/2006 | Pasch |
| 2006/0266627 A1 | 11/2006 | Krisl |
| 2007/0051588 A1 * | 3/2007 | Russell ........................ 198/851 |
| 2007/0175736 A1 | 8/2007 | Bickel, Jr. et al. |
| 2008/0011587 A1 | 1/2008 | Stebnicki et al. |
| 2008/0023304 A1 | 1/2008 | Elsner |
| 2008/0083598 A1 | 4/2008 | Guldenfels |
| 2008/0210528 A1 | 9/2008 | Menke et al. |
| 2009/0014290 A1 | 1/2009 | Jansen et al. |
| 2009/0057108 A1 | 3/2009 | Paardekooper et al. |
| 2009/0266682 A1 | 10/2009 | Elsner |
| 2009/0277758 A1 | 11/2009 | Marshall |
| 2009/0308716 A1 | 12/2009 | Marsetti |
| 2010/0065405 A1 | 3/2010 | Lagneaux |
| 2010/0175969 A1 | 7/2010 | Marsetti |
| 2010/0236901 A1 | 9/2010 | Marshall |
| 2010/0282577 A1 | 11/2010 | Rettore et al. |
| 2011/0017576 A1 | 1/2011 | Andersen |
| 2011/0100784 A1 | 5/2011 | Prakasam et al. |
| 2011/0226593 A1 | 9/2011 | Hall et al. |
| 2011/0278136 A1 | 11/2011 | Weiser et al. |
| 2012/0037480 A1 | 2/2012 | Meulenkamp et al. |
| 2012/0090953 A1 | 4/2012 | Cieplak et al. |
| 2012/0125742 A1 | 5/2012 | Corley et al. |
| 2014/0231226 A1 | 8/2014 | Sharma et al. |
| 2014/0231227 A1 | 8/2014 | Sharma et al. |

FOREIGN PATENT DOCUMENTS

| | | |
|---|---|---|
| CA | 2566004 A1 | 11/2005 |
| DE | 8530825 U1 | 1/1986 |
| EP | 0 207 577 A1 | 1/1987 |
| EP | 0 480 863 A1 | 4/1992 |
| EP | 0 527 584 A1 | 2/1993 |
| EP | 0 790 196 A1 | 8/1997 |
| EP | 0 810 168 A1 | 12/1997 |
| EP | 1 148 003 A1 | 10/2001 |
| FR | 2846642 A1 | 5/2004 |
| GB | 2008523 A | 6/1979 |
| JP | 03-714873 B2 | 9/2005 |
| JP | 2006-124062 | 5/2006 |
| JP | 03-798318 B2 | 7/2006 |
| SE | 211992 | 11/1966 |
| WO | WO 2006/120354 A1 | 11/2006 |
| WO | WO 2014/066556 A1 | 5/2014 |
| WO | WO 2014/085688 A2 | 6/2014 |

OTHER PUBLICATIONS

2256 Series 1" pitch side flexing belt for material handling/logistics purposes, Jun. 2010, 4 pages.

Re-Examination U.S. Appl. No. 95/000,071, filed Jan. 26, 2005, Guldenfels.

* cited by examiner

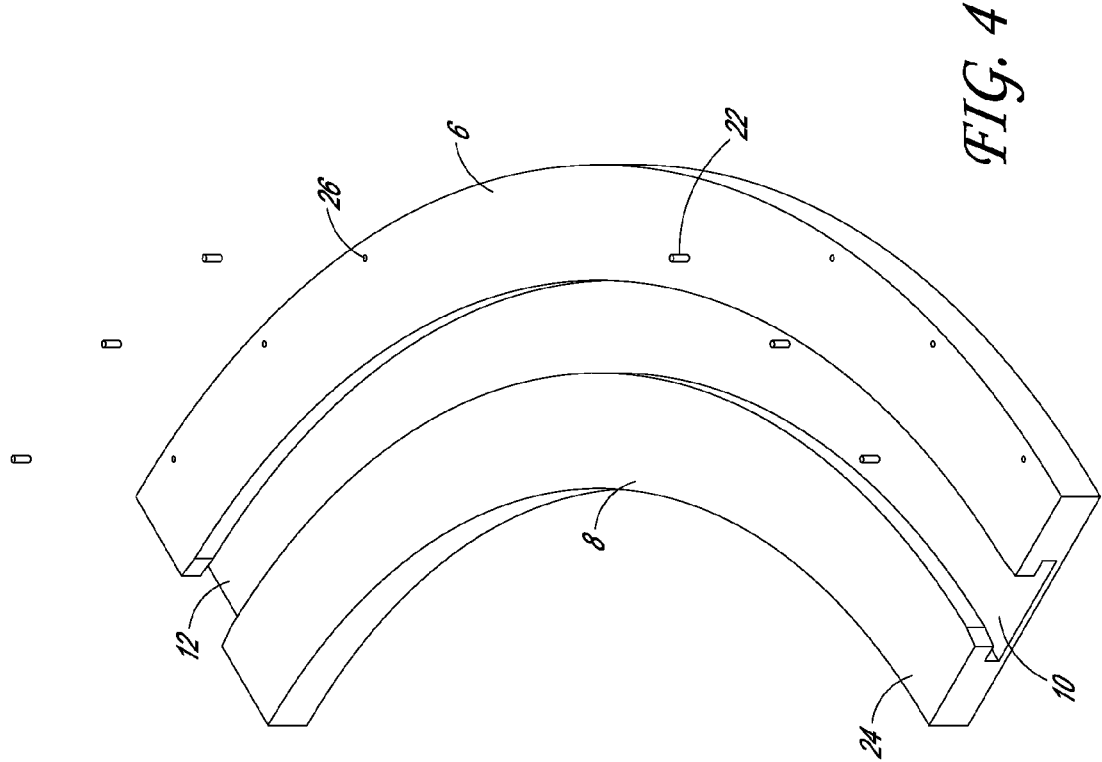

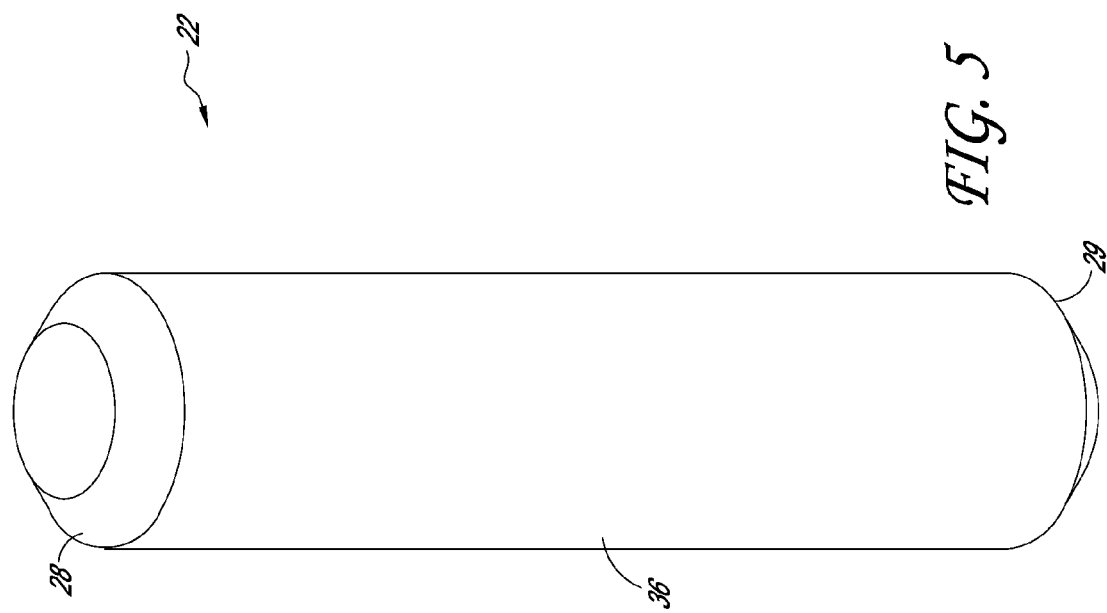

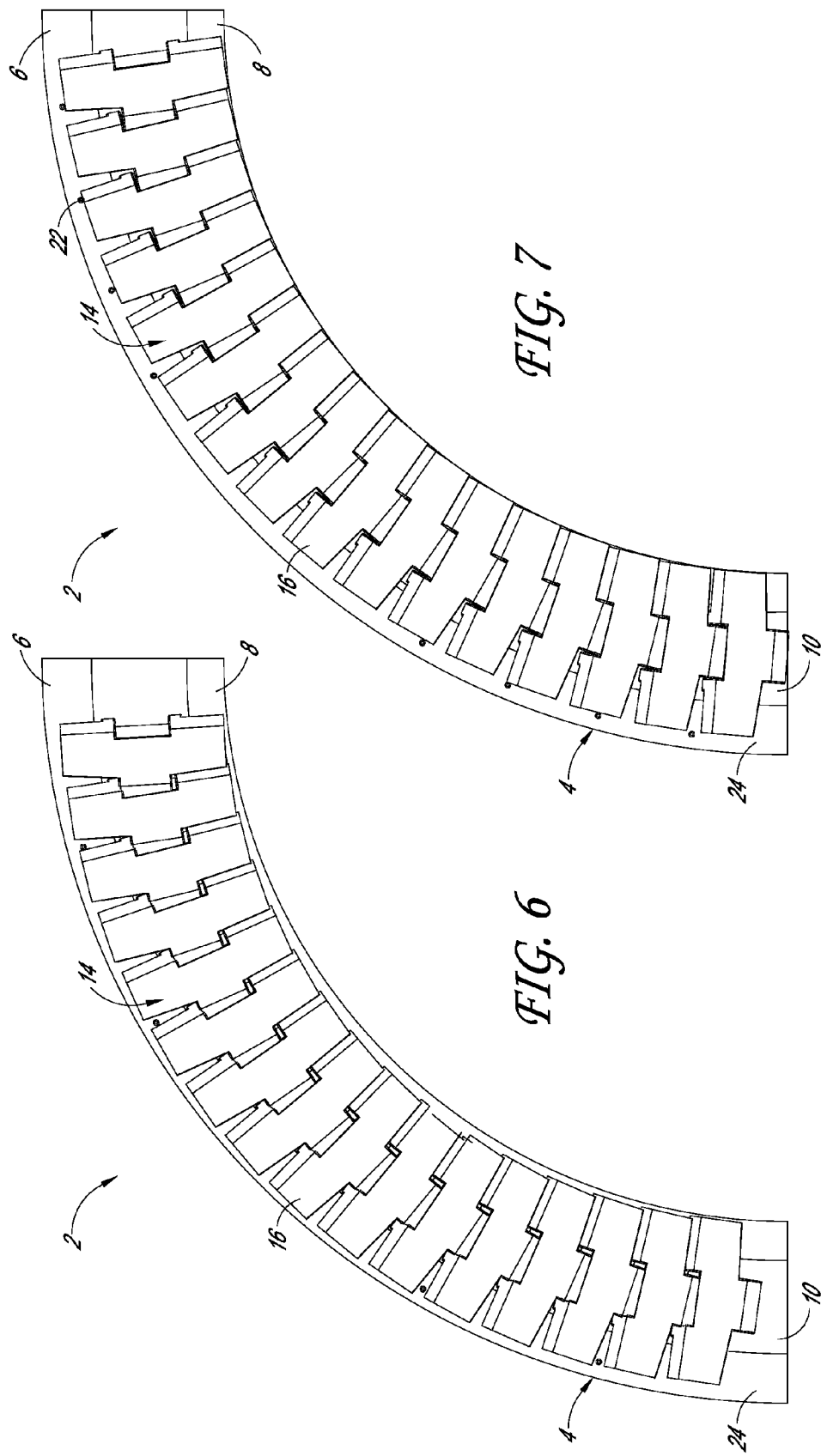

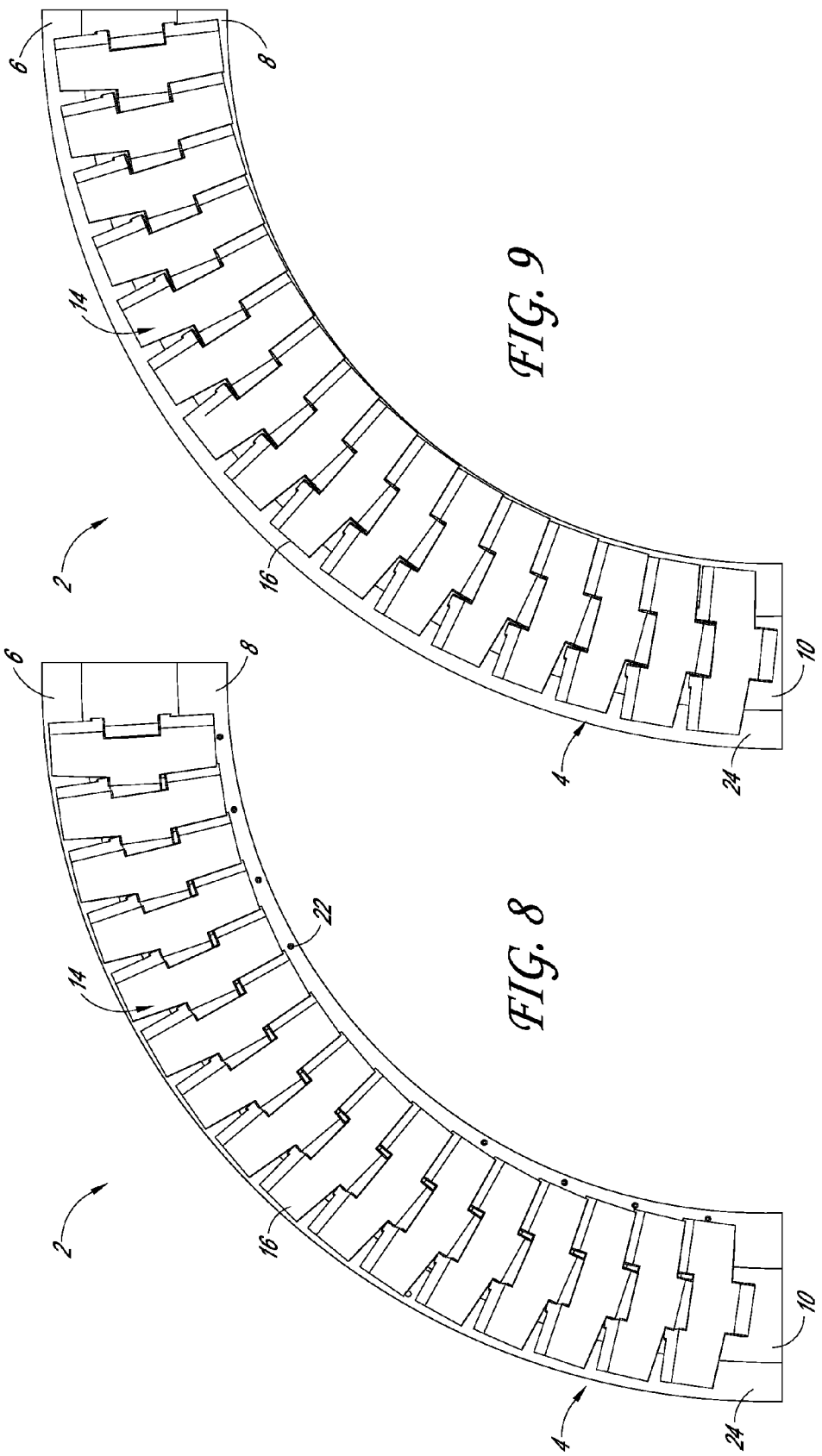

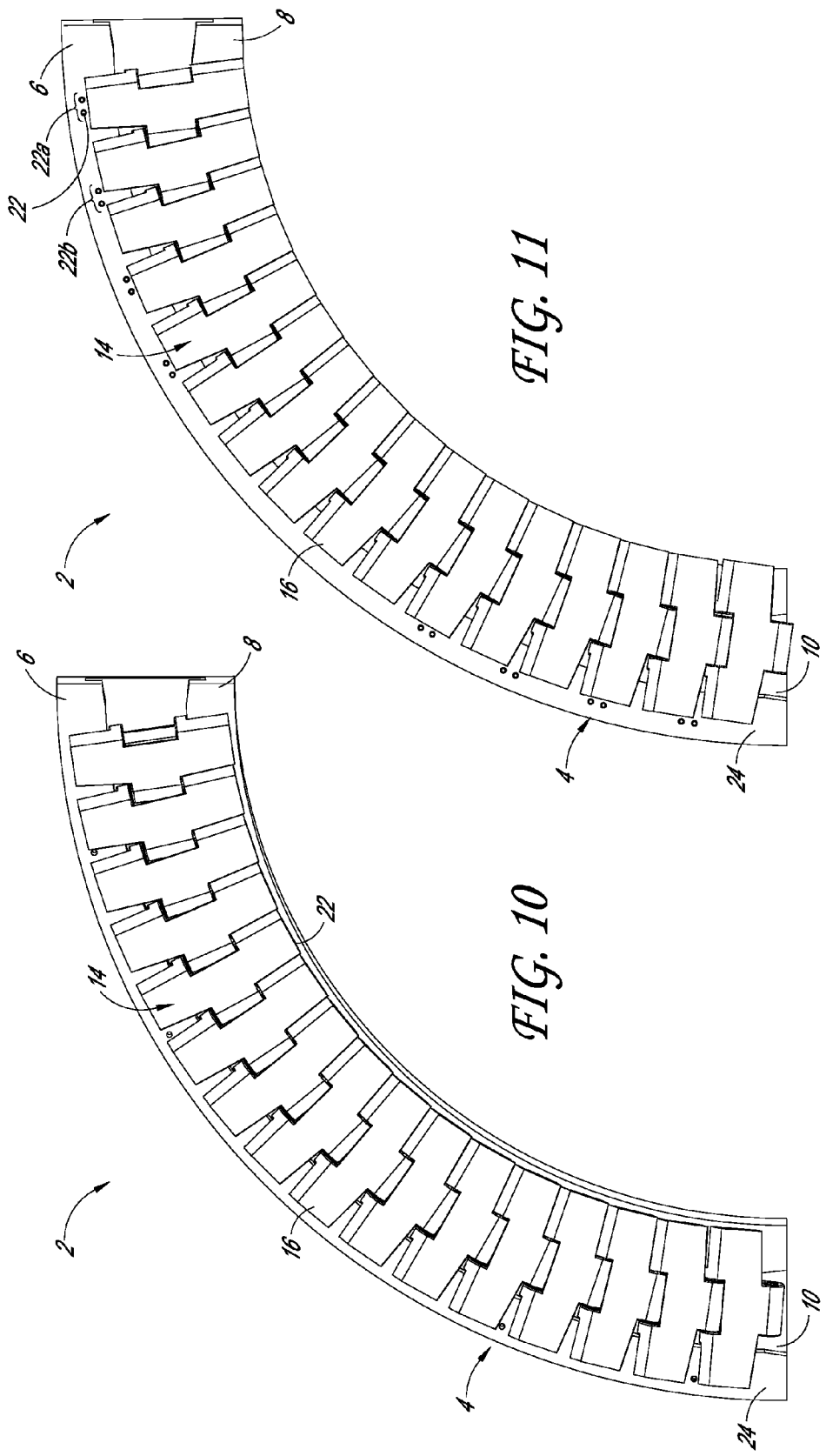

CONVEYOR SYSTEM WEAR INDICATION DEVICES AND METHODS

INCORPORATION BY REFERENCE TO ANY PRIORITY APPLICATIONS

All applications for which a foreign or domestic priority claim is identified in the Application Data Sheet as filed with the present application are hereby incorporated by reference herein under 37 C.F.R. §1.57.

The present application claims priority benefit under 35 U.S.C. §119(e) of U.S. Provisional Application Ser. No. 61/718,669, filed Oct. 25, 2012, entitled "WEAR INDICATORS," the entirety of which is hereby incorporated by reference herein.

BACKGROUND

1. Field

The present disclosure relates to devices and methods for indicating the existence and/or the level of wear of components that move relative to each other, and certain embodiments relate to devices and methods for indicating wear in a conveyor system.

2. Description of the Related Art

Certain conveyors are configured to operate along a track. As the conveyor moves along the track, the conveyor contacts portions of the track. The contact between the conveyor and the track can cause friction, which can result in wear or deterioration of the conveyor, the track, or both. Generally, repair, replacement, or adjustment is recommended after a certain level of wear or deterioration has occurred, in order to avoid failure of the track and/or damage to the conveyor or products carried by the conveyor.

SUMMARY OF THE DISCLOSURE

Various conveyor systems include a conveyor (e.g., a modular or non-modular chain or belt) that travels along a track. Over time, the track may begin to wear due to the friction between the track and the conveyor. This can eventually require removal, adjustment, repair, replacement, or other maintenance of the track. Wear on the track can be monitored or detected by inspecting the track for a change in dimension, shape, position, or the like. For example, wear may be determined by inspecting (e.g., visually, with measuring tools, or otherwise) a dimension (e.g., width, depth, angle, or otherwise) of a channel that is configured to receive a portion of the conveyor.

However, the wear of the track can be difficult to determine (e.g., observe, measure, or otherwise discern) while the conveyor system is operating. The conveyor may need to be slowed or stopped to conduct an accurate inspection of the track, or the conveyor may even need to be removed from the track. This can be inconvenient and can result in a reduction of conveying capability, inefficiency, lost time, and increased cost. Nevertheless, determining the level of wear on the track can be desirable and/or important because elevated levels of wear can lead to decreased performance or even failure of the conveying system. Accordingly, in some embodiments, it can be beneficial to be able to determine an indication of wear by a visual inspection of the conveyor and/or track during normal operation of the conveyor, such as when the conveyor is moving relative to the track at substantially its operating speed.

Further, measurement instruments may be needed to determine whether, and/or by how much, the track has worn or how much the conveyor has shifted or otherwise moved (e.g., relative to the unworn position). This can be inconvenient, as it requires locating and using those instruments. Moreover, the measurement itself may not provide an indication of whether the amount of wear is still within a recommended or permissible range. Accordingly, in some embodiments, it can be desirable to be able to determine the amount of wear without measurement instruments and/or for the indication of wear to provide an indication of the wear status (e.g., whether the amount of wear is within a permissible range or not).

In some embodiments, a conveyor track (e.g., a rail, channel, or other structure configured to support and/or direct a conveyor) is provided with a wear and/or movement indicator system. The wear and/or movement indicator system can be configured to assist a user (e.g., an operator, maintenance person, assembler, or otherwise) to determine whether a conveyor has moved relative to the unworn position, which can indicate that the conveyor track is worn and is in need of replacement, adjustment, or repair. Such a track can be called a "wear-indicating conveyor track" or a "wear-indicating track." In some embodiments, the indicator system is visible on an upper surface of a stationary track upon initial installation, such as before a moveable conveyor member is removably positioned on the track. The indicator system can help to demonstrate whether and/or by how much a moveable conveyor member has shifted laterally with respect to the track over time.

Certain aspects of the disclosure are directed toward embodiments of a wear-indicating conveyor track, such as a track along a curve. The track can include an upper surface that is configured to interface with a moveable conveyor. The upper surface can have lateral sides. The track can also include one or more indicators disposed on or in at least the upper surface of the track. The one or more indicators can be generally flush with the upper surface when the track is in a first phase of wear (e.g., an initial or substantially unworn state). The one or more indicators can be configured so as to be substantially obscured from view by a conveyor placed on the track when the conveyor is moving relative to the track and the track is in the first phase of wear. The one or more indicators can also be configured to be generally visible when the conveyor is moving relative to the track and the track is in a second phase of wear (e.g., a level of wear in which the track is in need of repair, replacement, or other maintenance). In some embodiments, the one or more indicators being generally visible indicates that the track is in need of repair or replacement. Some implementations include a combination of the wear-indicating conveyor track and the conveyor.

Certain aspects of the disclosure are directed toward embodiments of a wear-indicating conveyor track including a curved track and a plurality of wear indicators. In some embodiments, the wear indicators are embedded in the track. The wear indicators can be generally visible on an upper surface of the track when the track is in a generally unworn state. The track can be configured to engage a conveyor to guide the conveyor through the curve in a manner that is configured to generate friction between the track and the conveyor, thereby causing the track to wear (e.g., erode, gall, or otherwise degrade). In some embodiments, as the track wears, the conveyor can shift laterally relative to the track such that a portion of at least some of the indicators is obscured from view by the conveyor, thereby providing a visual indication that the track has experienced wear. In some embodiments, a conveyor system includes the curved track and the conveyor.

Certain aspects of the disclosure are directed toward embodiments of a wear-indicating conveyor track having an upper surface configured to interface with a moveable conveyor. The upper surface can include lateral sides. One or more indicators can be disposed on or in at least the upper surface of the track. The one or more indicators can be generally flush with the upper surface upon initial use. The one or more indicators can be positioned on the track spaced from the lateral sides of the track so as to be configured to be covered by a conveyor when a conveyor is placed on the track during a first phase of use and to be uncovered or exposed during a second phase of use.

Certain aspects of the disclosure are directed toward embodiments of a conveyor system including a track having an upper surface and a lower surface. An indicator opening can be disposed along the upper surface of the track, and an indicator can be positioned in the opening. The system can also include a conveyor movable along the track. In certain aspects, the conveyor can be a chain or belt. The conveyor can be configured to curve or bend, such as in the plane of travel of the conveyor.

Certain aspects of the disclosure are directed toward embodiments of a conveyor system including one or more of the wear-indicating conveyor tracks described herein in combination with a moveable conveyor (e.g., a chain, belt, or otherwise). Some embodiments of the system can also include other system components, such as sprockets, idler rollers, motors, bearings, supports, guide rails, or otherwise.

Any of the embodiments described above, or described elsewhere herein, can include one or more of the following features. The track can include an inner rail and an outer rail, and the indicator opening can be disposed along the outer rail. In some embodiments, an end of the wear indicator can be positioned such that the end is flush with the upper surface of the track. The conveyor can be positioned over the indicator such that at least a portion the indicator is generally not visible, such as the conveyor obscuring the portion of the indicator from view (e.g., by a person viewing the conveyor from above the conveyor). In certain embodiments, the indicator can include UHMW polyethylene. In some embodiments, the indicator can be substantially cylindrical. In certain embodiments, the indicator can be a color that contrasts with the color of the track. For example, the indicator can be red, orange, yellow, white, or otherwise. In some implementations, the track has a gray or black color.

Any of the embodiments described above, or described elsewhere herein, can include one or more of the following features. The conveyor track can include multiple indicator openings and multiple indicators. The number of indicator openings can be equal to the number of indicators. At least a subset of the indicators can be equally spaced apart. In certain aspects, the indicators can be circumferentially spaced apart. A degree of curvature between a first indicator and a second indicator can be 30 degrees or less. In certain aspects, multiple indicators can include a first indicator, a second indicator, and a third indicator. The second indicator can be positioned closer to the first indicator than the third indicator. In certain aspects, at least a subset of the indicators can be radially spaced apart.

Any of the embodiments described above, or described elsewhere herein, can include one or more of the following features. The track can include an inner rail and an outer rail. Each of the one or more indicators can be disposed in an indicator opening along the outer rail. The indicator opening can be disposed along the inner rail. The track can be curved and the indicators can be circumferentially spaced apart along the curve. A degree of curvature between a first indicator and a second indicator can be less than about: 5°, 10°, 15°, 20°, 30°, 45°, 90°, values in between the aforementioned values, and otherwise. The track can have one or more indicators, such as a first indicator, a second indicator, and a third indicator. The first and second indicators can be spaced apart by a first distance. The second and third indicators can be spaced apart by a second distance. The first distance can be less than or equal to the second distance.

Certain aspects of the disclosure are directed toward embodiments of a method of assembling a conveyor system. The method can include forming an indicator opening in a track (e.g., on an upper surface of the track). The method can also include inserting an indicator into the indicator opening; removing a portion of the indicator until an end of the indicator is flush with an upper surface of the track. In some embodiments, the method includes positioning a conveyor over the track such that at least a portion of the indicator is not visible.

Certain aspects of this disclosure are directed toward embodiments of a method of conveying including moving a conveyor along a track. The track can include an inner rail and an outer rail. Some embodiments of the method include shifting the conveyor toward the inner rail. In some embodiments, the method includes revealing at least a portion of an indicator. The method can also include replacing the track when the at least a portion of the indicator is visible (e.g., from a vantage point above the conveyor and/or looking generally perpendicularly down on a top surface of the conveyor). In certain embodiments, the method includes obscuring at least a portion of an indicator. The method can also include replacing the track when the at least a portion of the indicator is obscured from view (e.g., from a vantage point above the conveyor and/or looking generally perpendicularly down on a top surface of the conveyor).

Any of the embodiments of the methods described above, or described elsewhere herein, can include one or more of the following features. Some embodiments of the method can include forming multiple indicator openings in the track. In certain aspects, the method can include inserting multiple indicators into the multiple indicator openings. The multiple indicators can be equal to the multiple indicator openings. Forming the multiple indicator openings can include forming the multiple indicator openings circumferentially spaced apart from each other.

Any of the features, structures, steps, or processes disclosed in this specification can be included in any embodiment. Further, any feature, structure, or step discussed above or disclosed elsewhere herein can be replaced with or combined with any other feature, structure, or step discussed above disclosed herein. Any feature, structure, or step discussed above or disclosed elsewhere herein can be omitted. No aspect of this disclosure is essential or indispensable.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 4 illustrates an exploded view of the track and the indicators of FIG. 3.

FIG. 5 illustrates an embodiment of an indicator.

FIG. 6 illustrates a top view of a conveyor system with indicators positioned in an outer rail region, the system shown in a first state of wear.

FIG. 7 illustrates a top view of the conveyor system of FIG. 6 in a second state of wear.

FIG. 8 illustrates a top view of another conveyor system with indicators positioned in an inner rail region, the system shown in a first state of wear.

FIG. 9 illustrates a top view of the conveyor system of FIG. 8 in a second state of wear.

FIG. 10 illustrates a top view of another conveyor system with indicators positioned in an outer rail region, the system shown in a first state of wear.

FIG. 11 illustrates a top view of the conveyor system of FIG. 10 in a second state of wear.

DETAILED DESCRIPTION

Figure 1:
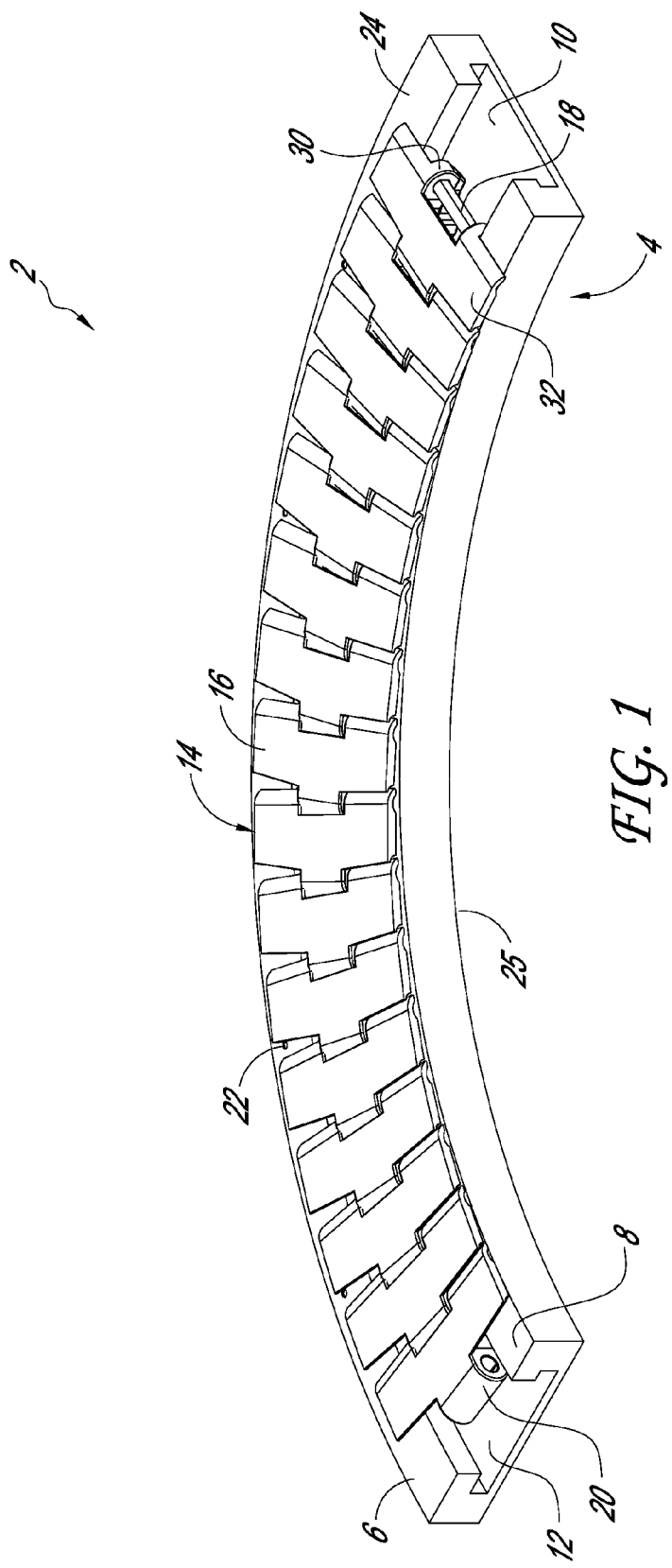
FIG. 1 illustrates an embodiment of a chain conveyor system.

The conveyor systems described below illustrate various examples that may be employed to achieve one or more desired improvements. These examples are only illustrative and not intended in any way to restrict the general disclosure presented and the various aspects and features of the disclosure. Certain aspects, advantages, and features of the inventions have been described herein. It is not necessary that any or all such aspects, advantages, and features are achieved in accordance with any particular embodiment. Indeed, not all embodiments achieve the advantages described herein, but may achieve different advantages instead. Any structure, feature, or step in one example is contemplated to be used in place of or in addition to any structure, feature, or step of any other example. No features, structure, or step disclosed herein is essential or indispensable.

Conveyor systems generally include a track and a conveyor movable along (e.g., relative to) the track. Over time, the track and/or conveyor may begin to wear, or otherwise degrade, such as due to the friction between the track and the conveyor. This can eventually require removal, adjustment, replacement, or other service of the track. A track is generally not replaced until the track has sustained a certain level of wear. However, if the track is not replaced in a timely manner, excessive deterioration of the track may damage other components of the conveyor system or products carried by the conveyor system, and/or lead to performance anomalies or break-downs. For example, deterioration of the track can cause the conveyor to jerk, vibrate, derail or shift off the track, or otherwise perform sub-optimally. This can result in reduced operating performance (e.g., operating speed) or even a shut down or jam of the conveyor system. Repairing the conveyor system can lead to unplanned and unproductive down time.

In some embodiments, wear or other degradation of the track and/or conveyor can affect the special relationship between the track and the conveyor. For example, wear on the track can allow the conveyor to shift laterally relative to an intended or unworn traveling path. In certain variants, wear on the track can result in the conveyor shifting laterally relative to the track, such as traveling on a path that is closer to an inside or outside edge of the track in a curve than would be the path of travel when the track is not worn. In some embodiments, the spatial relationship between the track and conveyor can be influenced by adjustments in the conveying system and/or by the presence or absence of other components in the conveyor system. These adjustments and/or the configuration of the conveying system can cause the conveyor to shift laterally on the track, away from an intended or ideal travelling position, regardless of whether or not the track has been overly worn.

In some embodiments, the conveyor system includes one or more wear indicators configured to assist in demonstrating wear in the conveyor system. Certain embodiments have wear indicators that are configured to indicate lateral shift (or other signs of wear or movement) of the conveyor relative to the track. Some variants even have wear indicators that are configured to indicate an approximate amount or degree of wear or movement. In some embodiments, the lateral shift can be perceivable by a user even when the conveyor is running or when the conveyor is on the track, without requiring any measuring tools or other devices to obtain a generally accurate reading. The wear indicators described herein can be used with any type of conveyor system, including, but not limited to, table top conveyors, belt conveyors (e.g., mat belt conveyors), elevator conveyors, air conveyors, chain conveyors, and flexible belt conveyors. The wear indicators can also be used with various track configurations, such as straight track portions or curved track portions.

In some embodiments, at least one or a plurality of wear indicators can be used with a chain conveyor system with a curved track, such as is illustrated by FIG. 1. Curved track portions can be especially prone to deterioration along the inner curve of the curved track portion. As the inner curve deteriorates, the conveyor shifts inward toward the worn portion of the track. The displacement of the conveyor can create a substantial drag on the conveyor driving mechanism (e.g., one or more sprockets and motors), damage the conveyor, and/or eventually cause the entire system to shut down. In some embodiments, an indicator or a series of indicators can be used in different positions on a track and/or with many different types of conveyors. For example, in some embodiments, one or more indicators can be positioned on a generally vertically oriented wall or other generally vertically oriented feature of a track to help determine whether, or to what degree, a conveyor has shifted in a generally vertical orientation, such as when a track on which a conveyor is running wears out by thinning down over time. In some embodiments, a suitably configured indicator can be provided on a conveyor instead of, or in addition to, an indicator on a track. For example, in situations where at least a portion of the conveyor is generally or initially obscured during use by an overlapping portion of the track or some other structure, an indicator on the conveyor can emerge from the obscured region and become viewable for visual inspection upon shifting of the conveyor and/or wear of the track.

Figure 2:
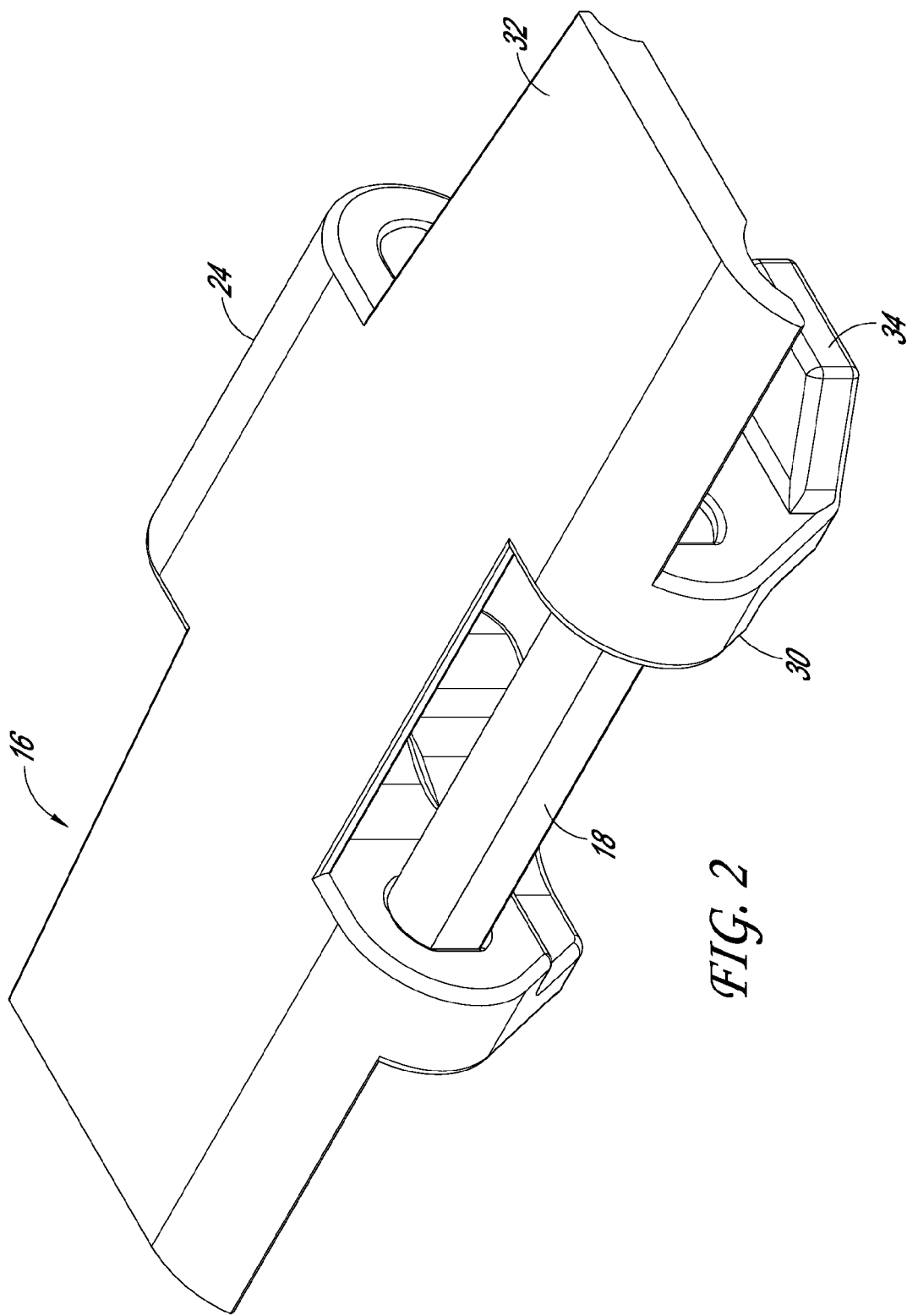
FIG. 2 illustrates an embodiment of a conveyor module.

FIG. 1 illustrates a chain conveyor system 2, including a chain 14 (e.g., a modular or non-modular chain or belt) that is moveable along a track 4. In various embodiments, chain 14 can be configured to curve, bend, or flex so as to move along a curved portion of the track 4. In some embodiments, the chain 14 comprises a plurality of interconnected tabs 16. As shown in FIG. 2, each tab 16 includes an upper portion 32 and a lower portion 34. Each tab 16 can include a male connector portion 24 and a female connector portion 30. The female connector portion 30 of the tab 16 receives the male connector portion 20 of an adjacent tab, and the female connector portion 30 is secured to the adjacent male connector portion 20 by a pin 18. The chain conveyor of FIG. 1 is merely an example of one particular type of conveyor; any other type of conveyor can be used.

Figure 3:
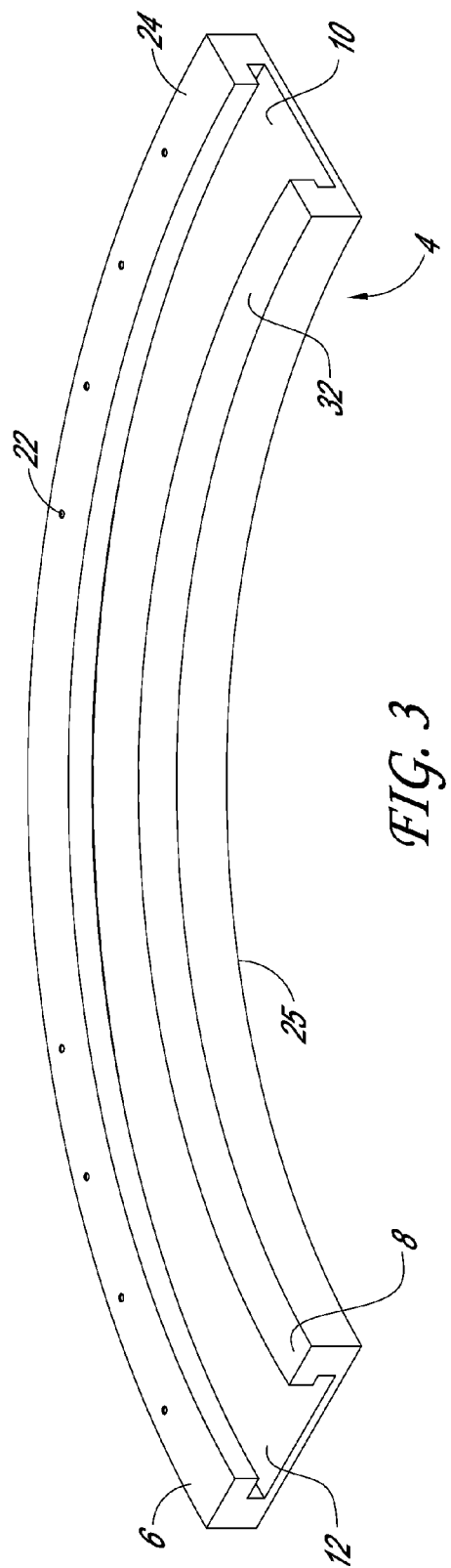
FIG. 3 illustrates an embodiment of a track including one or more wear or movement indicators.

FIG. 3 illustrates a curved portion of the track 4. The track 4 includes an upper generally horizontal surface 24 and a lower generally horizontal surface 25. The track 4 also includes an outer rail 6 and an inner rail 8. The outer rail 6 and the inner rail 8 define at least a portion of a guide 10. As shown in FIG. 1, the lower portion 34 of each tab 16 moves along the guide 10 of the track 4, while the upper portion 32 of each tab 16 moves along the upper surface 24 of the track 4.

The conveyor system 2 can include one or more indicators 22, such as wear and/or shift indicators as shown, in a generally horizontal portion of each track segment. For example, the conveyor system 2 can include at least two indicators, or at least six indicators, or at least eight indicators, per section of track. The indicators 22 are positioned along the upper surface 24 of the track 4. The indicators 22 can be positioned (e.g., embedded) in the track 4. For example, each indicator 22 can be positioned in an indicator opening 26. As shown by FIG. 4, the track 4 can include one or more indicator openings 26 for each indicator 22. Each indicator opening 26 may traverse the track 4 from the upper surface 24 to the lower surface 24, or each indicator opening 26 may only traverse a partial thickness of the track 4.

In some embodiments, one or more indicators can be constructed in or applied to the track, or other surface, in a manner other than being positioned in an indicator opening. For example, one or more indicators may comprise painted or other coated regions. The painted or other coated regions can be located on a surface of the track 4, such as on an upper surface of the track 4. In certain variants, the paint or other coating can be worn away to help indicate shift or other movement in a conveyor. In some implementations, the paint or other coating is located in one or more indented regions (e.g., recesses, channels, or the like) to inhibit or prevent the conveyor from wearing away the paint or other coating. In some embodiments, the one or more indicators can comprise one or more continuous or non-continuous stripes. The one or more stripes can be painted on and/or indented into the track 4. In some embodiments, the one or more stripes extend along the track at a generally constant distance from a lateral side of the track. In some implementations, the one or more stripes extend along the track at a non-constant distance from a lateral side of the track.

As shown in FIG. 3, in some embodiments, the indicators 22 can be spaced from each other at generally regular intervals along the direction of travel at a generally constant distance from a lateral side of the track (e.g., from the outer lateral side of the track). In particular, on a curved section of the track, the indicators 22 can be circumferentially spaced along the outer rail 6 of the track 4, but in some scenarios, it may be desirable to position the indicators 22 along the inner rail 8. The indicators 22 may be positioned along the outer rail 6 across from the areas of the inner rail 8 that are likely to experience the most wear.

In some embodiments, the shape or pattern of indicators can help to demonstrate an amount of wear or shift. For example, a generally triangular or generally wedge-shaped indicator, or any other shape that becomes wider or longer as more of it is exposed, can help a user to estimate how much wear and/or shift has occurred. Additional examples of indicators that can provide information about the extent of wear and/or shift include a series of closely-spaced bars, symbols, (e.g., numbers and/or letters), or other indicia. The indicia can be positioned generally transversely to the direction of travel so that wear or shift of the conveyor exposes increasing amounts of the indicia, such as increasingly longer bars or additional symbols (e.g., increasing numbers), which can reveal the extent of wear or shift.

In addition, or in the alternative, a plurality of colors can be provided to indicate a degree of wear and/or shift. The indicators may be multi-colored to indicate the level of wear. For example, a first indicator or a first portion of an indicator that is nearer to the outside of the initial, unworn, or unshifted position can be provided in a first color (e.g., green or yellow), and at least a second indicator or a second portion of an indicator that is spaced away in the direction of lateral shift from the first indicator or first portion of an indicator can be provided in a second color (e.g., yellow or red). For example, if a first color is visible, then it may indicate that the conveyor system may soon need maintenance. If a second color is visible, then it may indicate that the conveyor system needs more immediate maintenance or attention. A series of first indicators or first portions of indicators can be provided at about the same first distance from an edge of the track, and a series of second indicators or second portions of an indicator can be provided at about the same second distance from an edge of the track, with the second distance being further in the direction of movement or wear than the first distance.

At least some of the indicators 22 may be equally spaced apart around the circumference of at least a segment of the track. In some scenarios, all of the indicators 22 are equally spaced apart around the circumference of the track. In other scenarios, as shown in FIG. 3, a first subset of indicators 22 are equally spaced apart and positioned closer to a first end of the track 4, and a second subset of indicators 22 are equally spaced apart and positioned closer to a second end of the track 4.

The indicators 22 may be positioned such that the degree of curvature between two indicators is about 30 degrees or less. In some scenarios, the degree of curvature between two indicators is about 15 degrees or less. In other scenarios, the degree of curvature between two indicators is about 7.5 degrees.

In some embodiments, each indicator 22 includes a body portion 36. The body portion 36 of the indicator 22 can take on any shape, for example, the body portion 22 can be generally cylindrical, generally spherical, or generally rectangular. FIG. 5 illustrates a indicator 22 having a cylindrical body portion 36. The indicator also has a first end 28 and a second end 29. One or both ends of the indicator 22 may include a tapered portion such that the diameter of the first end 28 or the second end 29 is smaller than the diameter of the body portion 36 of the indicator 22. The indicator 22 can have a longitudinal length L and an outside diameter D. In some embodiments, the length L is greater than or equal to the diameter D. In some embodiments, the length L is less than or equal to the diameter D.

In some embodiments, one or more indicators 22 may comprise a same material as the material from which the track 4 is constructed. For example, the indicator may comprise an ultra-high molecular weight ("UHMW") material, such as UHMW polyethylene. This can help the indicators 22 to wear at about the same rate as the track 4. If the indicators 22 wear at a different rate than the track 4, then the indicators 22 may form protrusions in the track 4 and cause the chain 14 to move irregularly.

One or more of the indicators 22 may also be colored differently from one or more of the tracks for better visibility by creating a contrast between the color of the indicator 22 and the color of the track. For example, the indicators 22 may be red or yellow. If the indicator 22 is colored different from the track, then the indicator may be formed from a material that will not absorb the color of other conveyor system components.

To incorporate one or more indicators 22 into the conveyor system 2, one or more indicator openings 26 can be formed in the track 4. The indicators 22 can then be positioned in the indicator openings 26. A portion of the indicators 22 can be removed or the indicator can be appropriately positioned so that an end of the each indicator 22 is generally flush with the upper surface 24 of the track 4. The conveyor (e.g., chain 14) is then positioned over the track 4 to cover at least a portion of the indicators 22.

The indicator openings 26 may be formed beginning from the upper surface 24 of the track 4, such as by drilling or molding the track 4 with such openings. The openings may traverse the track 4 without penetrating the lower surface 25 of the track 4. However, in some designs it may be desirable for the indicator openings 26 to traverse the entire track 4 and penetrate the lower surface 25 of the track 4. The indicator openings 26 may also be formed beginning from the lower surface 25 of the track 4 to the upper surface 24 of the track 4.

FIGS. 6 and 7 illustrate a curved track 4 with indicators 22 positioned along the outer rail 6 of the track 4. The indicators 22 are spaced appropriately from the outer edge of the track 4 such that, before the track experiences appreciable or any wear, at least a portion of each indicator 22 is generally not visible (e.g., is substantially obscured by the chain) as the chain 14 moves along the track 4. As shown in FIG. 6, the chain 14 may fully cover each indicator 22, such that the indicators 22 are not visible beyond the outer edge of the chain 14. However, in some embodiments, as illustrated, the one or more indicators 22 are unobstructed and/or unobscured during use at an initial unworn and/or unshifted position in a generally flush or generally even orientation with an upper surface of the track that contacts the conveyor. For example, in some embodiments, a portion of a top surface or layer of the track does not initially cover, obscure, or lay over or above the one or more indicators 22.

As a portion of the track (e.g., the inner rail 8 of the track 4) begins to wear out, the chain 14 shifts to reveal the indicators 22 along a newly exposed portion of the track (e.g., the outer rail 6). In some embodiments, as illustrated, the indicators 22 are positioned a distance from the outer edge that is greater than the distance from a lateral edge of the track and an inner edge of the track. The indicators 22 can be spaced appropriately from the outer edge of the track such that at least a portion of the indicator 22 is visible when the track is sufficiently worn to warrant replacement. The indicators 22 may be configured to signal replacement when any portion of the indicator 22 is visible or only when the entire indicator 22 is visible.

FIG. 7 illustrates the worn conveyor system 2 with the indicators 22 generally visible beyond the outer edge of the chain 14. As used herein, the term "generally visible" denotes the characteristic of an observer being able to have a substantially constant line of sight to an observed component of the conveyor system 2 during normal operation of the conveyor system 2. For example, as shown in FIG. 7, when the chain 14 travels relative to the track 4 (as is typical during normal operation of the conveyor system 2), an observer would be able to have a substantially constant line of sight to the indicators 22. This is because, in the non-limiting embodiment of FIG. 7, indicators 22 are positioned laterally outward of the links of the chain 14. As such, the links of the chain 14 do not obscure (e.g., pass over) a portion of the indicators 22 or otherwise interfere with a substantially constant line of sight between the portion of the indicators 22 and the observer of the conveyor system 2. Thus, the indicators 22 are generally visible.

In contrast, in FIG. 6, although the indicators 22 may be viewable through gaps between adjacent links in the chain 14 (even when track 4 is in a generally unworn state), the indicators 22 are not generally visible. During typically operation of the conveyor system 2 (e.g., at a typical operating speed of the chain 14 relative to the track 4), the links of the chain 14 pass over and obscure the indicators 22, thereby substantially or completely interrupting the line of slight from the indicators 22 to an observer.

As discussed above, when the track 4 is sufficiently worn, the indicators 22 are generally visible. This can signal the user to replace, adjust, or otherwise service the track 4. In several embodiments, the indicators 22 can be generally visible even when the conveyor is running, which minimizes the need to shut down the system 2 to perform inspections. The indicators 22 enable the user to schedule maintenance of the conveyor system 2 prior to unexpected shut downs or jams.

FIGS. 8 and 9 illustrate a curved track 4 with indicators 22 positioned along the inner rail 8 of the track 4. The structures and features of these types of embodiments can be the same as or substantially the same as those described in other embodiments, but one or more of the following structures and features can be used instead of or in addition to the structures and features of other embodiments. The indicators 22 can be spaced appropriately from the inner edge of the track 4 such that, before the track experiences any wear, or an acceptable amount of wear up to a threshold point, at least a portion of each indicator 22 is visible as the chain 14 moves forward in the conveying direction along the track 4. For example, the distance between the lateral edge of a conveyor module and an inner surface of the track segment can be greater than the distance from one or more indicators 22 and an inner surface of the track. As shown in FIG. 8, the indicators 22 are visible beyond the inner edge of the chain 14. Thus, in some embodiments, a visual indication can be provided by one or more indicators 22 on each track segment by permitting the indicators 22 to be seen or not seen in order to indicate whether the track has shifted and become unacceptably worn.

As the inner rail 8 begins to wear, the chain 14 will shift to obscure (e.g., partially or completely cover) the indicators 22. The indicators 22 are spaced appropriately from the inner edge of the track such that at least a portion of the indicator 22 is not visible when the track 4 is sufficiently worn to warrant replacement. The indicators 22 may be configured to provide a visual signal that the track 4 is due for or otherwise in need of replacement, adjustment, or other service. In some embodiments, when any portion of the indicator 22 is not visible, then that can indicate that the track 4 has become worn. In certain implementations, when the chain 14 has obscured the entire indicator 22, then that can indicate that the track 4 has become worn. FIG. 9 illustrates the worn conveyor system 2 with the indicators 22 covered by the chain 14.

In some implementations, one or more of the indicators 22 is configured to engage the chain 14 as the track 4 wears. For example, one or more of the indicators 22 can be configured such that the indicator 22 contacts the chain 14 when a certain amount of wear has occurred. In some embodiments, the indicator 22 can be configured to produce a signal when the engagement occurs. For example, when the chain 14 engages the indicator 22 an audible noise (e.g., a squeak or buzz) can be generated by the movement of the chain 14 relative to the indicator 22. This can provide an alert to maintenance or other personnel that the track 4 has become worn, even if the maintenance or other personnel have not visually inspected the indicator 22. In certain embodiments, the audible signal is in addition to, or in place of, the visual signal previously discussed.

FIGS. 10 and 11 illustrate another configuration of the conveyor track 4 including one or more indicators 22. The one or more indicators 22 can include at least a first subset of indicators 22*a* and a second subset of indicators 22*b*. The first subset of indicators 22*a* and the second subset of indicators 22*b* can include a same number of indicators 22 or a different number of indicators 22. Each of the first and second subsets of indicators 22a, 22b can include one or more indicators 22, such as one indicator, two indicators, three indicators, four indicators, or more indicators. In some scenarios, it may be desirable for each of the first and second subset of indicators 22a, 22b to include at least two indicators 22, such that the indicators 22 are more easily visible. If the first and second subset of indicators 22a, 22b each include multiple indicators 22, the indicators 22 within each subset can be evenly spaced apart from each other, unevenly spaced apart from each other, or a combination of evenly an unevenly spaced (e.g., in an embodiment with three or more indicators 22).

As shown in FIG. 11, the first and second subsets of indicators 22a, 22b can each include two indicators 22. The distance between each of the indicators 22 in the first or second subsets 22a, 22b can be less than the distance between the first subset of indicators 22a and the second subset of indicators 22b. For example, each of the first and second subsets 22a, 22b can include a first indicator and a second indicator. The first indicator and the second indicator of the first subset of indicators 22a can be spaced apart by a first distance. The second indicator of the first subset of indicators 22a can be spaced apart from the first indicator of the second subset of indicators 22b by a second distance. The first distance can be less than the second distance.

In some variants, the one or more indicators 22 can include at least a first indicator, a second indicator, and a third indicator. The first indicator can be spaced apart from the second indicator by a first distance, and the second indicator can be spaced apart from the third indicator by a second distance that is greater than the first distance.

In some embodiments, the indicators 22 within each subset of indicators 22a, 22b can be spaced apart as a function of the radius of curvature of the track 4. For example, the subset of indicators 22a, 22b may be positioned such that the degree of curvature between the subsets (e.g., between subset 22a and subset 22b) is at least about 5° and/or less than or equal to about 90°, such as about 15°. In some variants, the indicators 22 within each subset 22a, 22b may be positioned such that the degree of curvature between each of the indicators 22 is at least about 0.1° and/or less than or equal to about 30°, such as about 5°.

In some implementations, at least one of the subsets of indicators 22a, 22b can include two or more radially displaced indicators (e.g., relative to each other). For example, the first subset of indicators can include a first indicator and a second indicator. The first indicator can be positioned closer to the radially outer edge of the track than the second indicator. Radially spaced apart indicators can provide multiple indications of the amount of wear. For example, if only the first indicator is visible, then that can indicate a first level of wear and/or a first warning (e.g., that the track should be replaced soon). If the first and second indicators are both visible, then that can indicate a second level of wear and/or a second warning (e.g., that the track should be replaced immediately). In some embodiments, the first and second indicators have different colors, symbols, or other indicia to indicate the level of wear and/or warning. For example, the first indicator can be yellow and the second indicator can be red.

In some instances, it may be desirable to include both laterally spaced apart indicators and circumferentially spaced apart indicators (as shown in FIG. 11 or otherwise described herein.)

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

Although the wear or shift indicators have been disclosed in the context of certain embodiments and examples, it will be understood by those skilled in the art that the wear or shift indicators extend beyond the specifically disclosed embodiments to other alternative embodiments and/or uses of the embodiments and certain modifications and equivalents thereof. For example, some embodiments can be configured to be used with other types of conveyor systems or configurations. It should be understood that various features and aspects of the disclosed embodiments can be combined with or substituted for one another. Accordingly, it is intended that the scope of the disclosure herein-disclosed should not be limited by the particular disclosed embodiments described above, but should be determined only by a fair reading of the claims that follow.

The following is claimed:

1. A method of indicating lateral wear on a conveyor, the method comprising:
    moving a conveyor along a curved track, the curved track including a laterally inner rail, a laterally outer rail, and an indicator of lateral wear of the track, the laterally outer rail having a laterally outermost edge, the laterally inner rail having a laterally innermost edge and a wear edge, the wear edge engaged with the conveyor;
    passing the conveyor over the indicator such that the conveyor obscures a top view of the indicator when the track is in a first wear state; and
    wearing away, with the conveyor, a portion of the wear edge of the laterally inner rail such that the track is in a second wear state in which, compared to the position of the conveyor in the first wear state, the conveyor has laterally shifted toward the laterally innermost edge of the inner rail and laterally away from the laterally outermost edge of the outer rail, thereby revealing a portion of the indicator of laterally wear of the track such that the portion is unobscured from the top view, wherein the indicator is embedded within the curved track and is a different color than the track.

2. The method of claim 1, further comprising replacing the track when the at least a portion of the indicator is visible.

3. The method of claim 1, wherein an end of the indicator is generally flush with an upper surface of the curved track.

4. The method of claim 1, wherein the wear edge is a generally vertical plane.

5. The method of claim 1, wherein the portion of the indicator is revealed when the track has experienced sufficient wear as to need maintenance.

6. The method of claim 1, further comprising: conducting an inspection to determine whether the portion of the indicator has been revealed.

7. The method of claim 6, wherein the inspection occurs during movement of the conveyor along the curved track.

8. The method of claim 7, wherein the inspection occurs without slowing the movement of the conveyor along the curved track.

9. The method of claim 7, wherein the inspection occurs at a normal operating speed of the conveyor along the curved track.

10. The method of claim 6, wherein conducting the inspection comprises looking generally perpendicularly down on a top surface of the conveyor and the track.

11. The method of claim 1, further comprising: determining a level of wear on the track.

12. The method of claim 11, wherein determining a level of wear on the track comprises determining an amount of the indicator that has been revealed.

13. The method of claim 11, wherein determining a level of wear on the track comprises determining a width of the revealed portion of the indicator.

14. The method of claim 11, wherein determining a level of wear on the track comprises observing a symbol.

15. The method of claim 1, wherein the indicator is embedded within the outer rail.

16. The method of claim 1, wherein the track includes a second indicator and a third indicator.

17. The method of claim 16, wherein the indicators are circumferentially spaced apart from each other along the curved track.

18. The method of claim 17, wherein each of the indicators are positioned approximately an equal lateral distance from an edge of the track.

19. The method of claim 1, wherein the color of the indicator is yellow, orange, or red.

20. The method of claim 1, wherein, when completely revealed, the indicator is substantially circular in shape.

21. The method of claim 1, wherein the first wear state is the substantially unworn state of the track.

22. The method of claim 1, wherein, when the track is in the first wear state, the indicator is visible by lifting a portion of the conveyor off of the track.

* * * * *